United States Patent [19]

Lynch

[11] Patent Number: 5,568,792
[45] Date of Patent: Oct. 29, 1996

[54] BIRD TRAINING DEVICE

[76] Inventor: James K. Lynch, 3 Hansen Ter., Revere, Mass. 02151

[21] Appl. No.: 326,089

[22] Filed: Oct. 19, 1994

[51] Int. Cl.⁶ .................................................. A01K 29/00
[52] U.S. Cl. .................................................................. 119/713
[58] Field of Search ............................. 119/713; 84/461, 84/462, 465, 466, 467, 470 R, 484

[56] References Cited

U.S. PATENT DOCUMENTS

| | | | |
|---|---|---|---|
| 3,847,120 | 11/1974 | Hicks | 119/713 |
| 4,213,372 | 7/1980 | Sasaki et al. | 84/470 R |
| 4,339,980 | 7/1982 | Hooke et al. | 84/470 R |
| 4,380,185 | 4/1983 | Holcomb | 84/470 R |
| 4,474,098 | 10/1984 | Pepersack et al. | 84/470 R X |
| 4,958,551 | 9/1990 | Lui | 84/484 X |

FOREIGN PATENT DOCUMENTS

| | | | |
|---|---|---|---|
| 2739609 | 3/1978 | Germany | 119/713 |
| 3728591 | 3/1989 | Germany | 119/713 |

*Primary Examiner*—Thomas Price
*Attorney, Agent, or Firm*—George W. Neuner

[57] ABSTRACT

A training device for teaching a bird to recite words, sounds or music is described. The device has a digital recording and playback device for recording and playing a desired message, a pattern generator that controls the playing of the desired message for a predetermined number of times at predetermined intervals; and a controller for variably adjusting the time between playing intervals and the number of times the desired message is played at each playing interval.

5 Claims, 6 Drawing Sheets

BIRD TRAINING DEVICE

FIELD OF THE INVENTION

This invention relates to devices for training birds, particularly to a device for training a bird to repeat words, sounds or music, and more particularly to such a training device having the capability for changing the teaching pattern in accord with a particular bird and the state of learning.

BACKGROUND OF THE INVENTION

Every year, more and more birds are being purchased from breeders and pet stores to become household pets. One reason the bird has always been a popular pet is that many birds in the parrot family are indeed very intelligent. Unlike any other pet, birds can be trained to speak, sing songs and recite sounds. This tends to be very rewarding and entertaining as the bird's vocabulary grows and has become a desired goal for many bird owners. According to experts, the proven method of training a bird to talk is to provide short training sessions several times throughout the day. The trainings should occur at the same time each day in a voice that the bird is familiar with. Each session should consist of clearly repeating the desired words or phrase for a period of several minutes. Understandably so, this structured training method presents a problem for most people. Few owners have the luxury of being in close proximity to the bird during the course of a day or are unable to reserve time for this repetitious task. For this reason, and the lack of perseverance of the owner, training usually becomes irregular and is reduced to a minimal amount, if any at all. This leads to results that are limited, if any, and causes frustration for both the bird and the owner.

It has previously been suggested that birds could be trained to talk from an endless loop magnetic tape playback unit that is operated by the weight of a bird on a perch as shown in the U.S. Pat. No. 3,847,120. However, this prior device lacks controlled periodic training sessions coupled with the mechanical integrity of the tape mechanism. The occurrence of a bird coming to rest on the perch to activate the mechanism and remaining fixed throughout the duration of the message playback provides a random and possibly incomplete training pattern. Because the activity level of a given bird varies due to age and species, at no moment is one sure of the frequency, duration or even occurrence of a training session. The prior art device provides minimal training, if any, with a less active bird while subjecting an energetic bird to constant "bombardment" of the recorded message.

Another shortcoming of the prior art device is the inability to maintain clear, precise word pronunciation. This device uses a magnetic tape for a recording medium that, during normal operation, is subjected to physical wear and abrasion from contacting magnetic heads and guide pulleys. This deterioration of the tape's magnetic surface degrades the sound quality of the recorded message, and if not serviced, will render the message playback illegible. Thus, it can be appreciated that improved devices for teaching a bird to recite words, music or sounds.

SUMMARY OF THE INVENTION

The present invention relates to a device that provides the tailored training of birds to repeat words, sound or music. The training device comprises a digital record playback unit that records, stores and replays the desired message to be taught to the bird; a pattern generator that controls the playing of the desired message for a predetermined number of times at predetermined intervals; and a controller for variably adjusting the time between playing intervals and the number of times the desired message is played at each playing interval.

Unlike prior art devices, in prefered training devices in accord with the present invention, the recording medium is not prone to the wear and abrasion that occurs when in use as does a magnetic tape mechanism. The playback unit, speaker, battery and required electronic circuitry are housed within an enclosure, preferably with means for securing the enclosure to the exterior of the bird's cage. Preferabnly, openings are provided in the enclosure directly in line with the speaker and positioned such that the sound will be projected toward the bird to be trained. The face of the enclosure typically provides several user switches and controls that facilitate recording the message and setting the specific training pattern to be used.

In a preferred embodiment, the training device includes a first switch that connects a source of electrical power to the device when operation is desired. A second switch capable of multiple switch settings is positioned to select either a message record mode or a message playback mode of operation. With the second switch in the record mode position, a third dual purpose momentary switch is depressed and held to initiate a message recording. A microphone element located on the face of the enclosure provides the means for converting the acoustic message to electrical signals that are digitally stored within the device. At the onset of the message recording, an indicator lamp positioned on the enclosure is illuminated to verify the recording process. The release of the third momentary switch terminates the recording process, causing the record indicator lamp to be extinguished.

After repositioning the second switch to the playback mode position, the third momentary switch is again depressed to sample the stored message previously recorded. This message recording and playback process may be repeated, if desired, until the user is satisfied with the stored message. With the second switch in the play mode position, a fourth switch is adjusted to select the optimum training profile, which I have found to be of great importance in proper training. Prior art devices lack this important feature. This fourth switch varies the time interval between successive training sessions along with the duration of each session, respectively. The switch can have multiple preset conditions or can be continuously variable. Thus, the user can select and vary the position of the fourth switch to match the individual learning capability of the bird to be trained. For example, rotating said fourth switch counter clockwise produces a more frequent training session that is shorter in length to accommodate a younger, active bird while rotating said fourth switch clockwise exhibits a less frequent, longer duration training session for a more mature, focused bird.

Once the user has stored the desired message and selected the training interval, the training device can be installed on the exterior of the bird's cage for operation. Then, unlike the random mechanical prior art device, training sessions will occur at the periodic rate selected and will always have an acoustic quality equal to that of the original message recording.

It can be seen that the present invention provides a device for training birds to repeat words, sounds or music that includes a recording playback unit for repeating the recorded sounds, which automatically provides periodic training sessions that are each composed of a predetermined period of message repetition. The device also provides the pet trainer with means to adjust the training interval and duration to match the learning capacity of the bird being trained.

As will be realized, the training device of the present invention can take a number of other forms and, thus, include many different embodiments, and its details are capable of modification in various respects by those of ordinary skill in the electronics art, all without departing from nature and teaching of the invention. Accordingly, the drawings and descriptions are to be regarded as illustrative in nature, and not as restrictive.

DETAILED DESCRIPTION OF THE INVENTION

Figure 1:
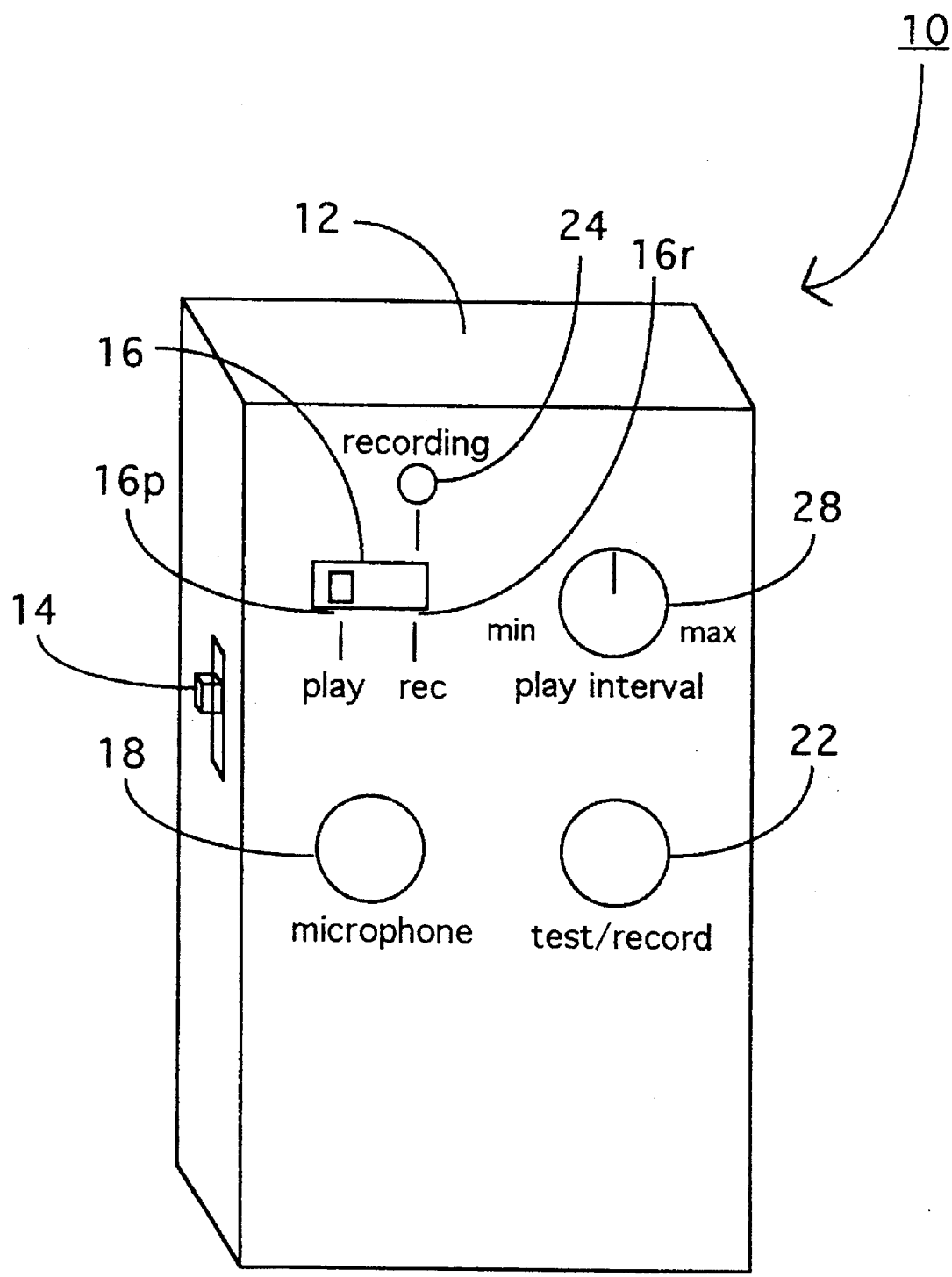
FIG. 1 is an isometric view of a bird training device that comprises the functions and features described within the teachings of the present invention.
Figure 2:
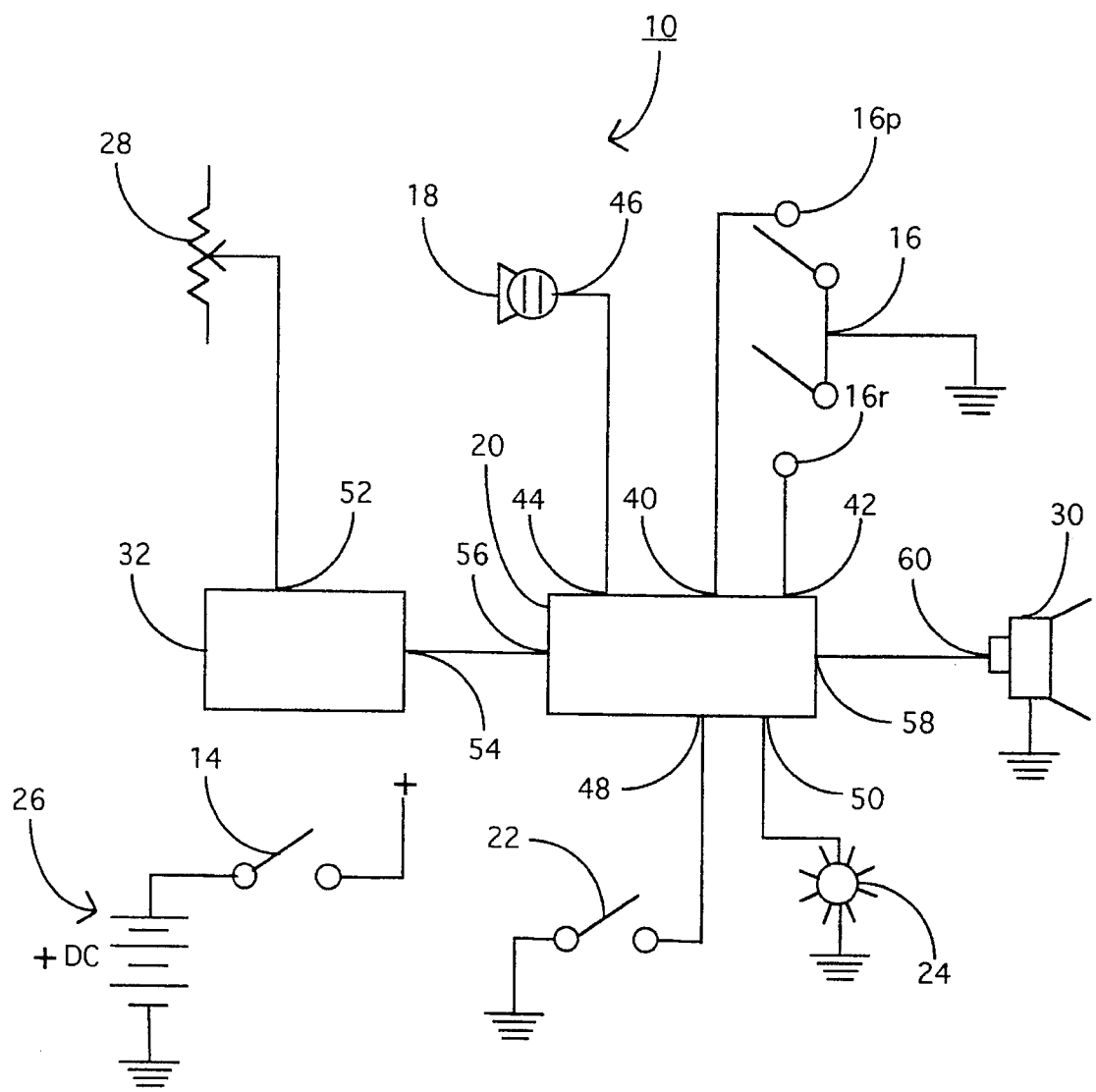
FIG. 2 is a block diagram of the bird training device.
Figure 3:
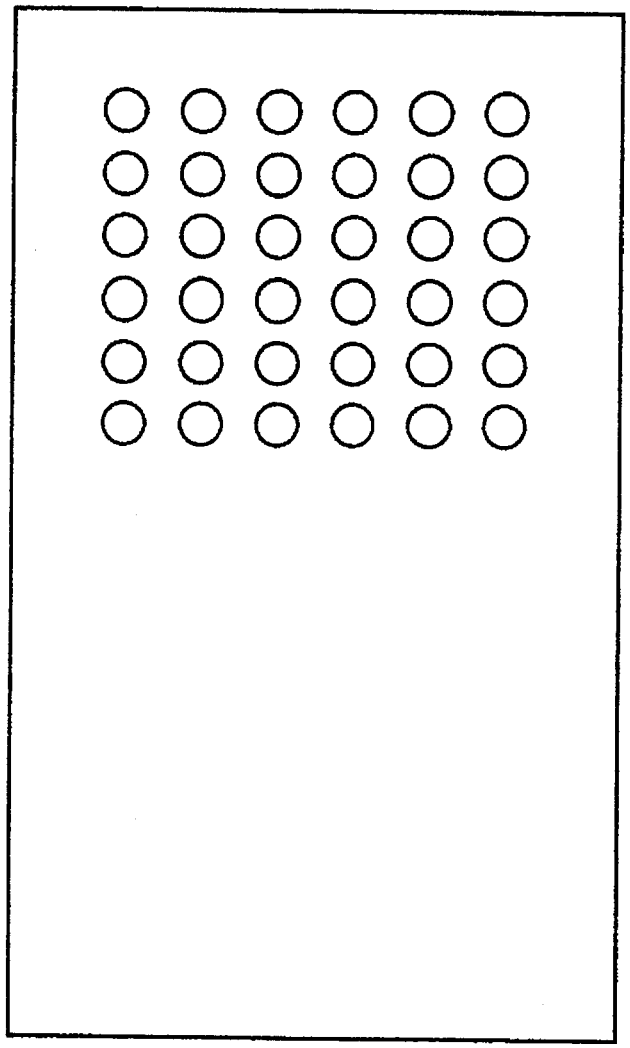
FIG. 3 is a rear view of the bird training device.

Referring to FIGS. 1 and 2, an example of a bird training device of the present invention comprises a device 10 having an enclosure 12 suitable holding the the necessary components of the bird training device. The device 10 has a record playback unit 20 and training pattern generator 32. A switch 14 connects electrical power 26 to the unit when operation is desired. A message record playback unit 20 has a first input 40 and a second input 42 from a dual position mode of operation switch 16. The mode switch 16 provides a first contact 16p (play) and a second contact 16r (record) that provides inputs 40 and 42, respectively. A microphone element 18 converts the spoken acoustic message to an electrical signal output 46, which provides input 44 to message unit 20. Record indicator lamp 24 receives input 50 from message unit 20 and provides visual verification to the user that a record function is in process. A test/record switch 22 provides input 48 to message unit 20 to initiate a message record or message playback operation. The message unit 20 also has an output 58 to input 60 of speaker 30 to acoustically reproduce the desired phrase or sounds to be taught to the bird.

Output 54 from training pattern generator 32 provides input 56 to the message unit 20. Pattern generator 32 (illustrated in more detail in FIG. 6) incorporates input 52 from play interval adjustment 28 to allow the customized training interval and duration for a specific bird being trained.

Figure 5:
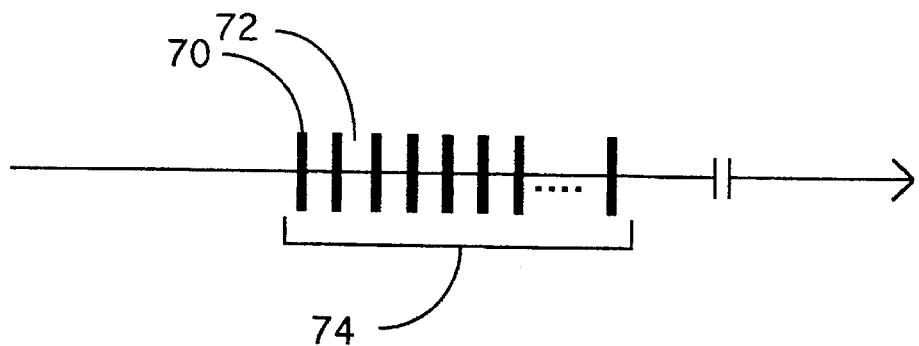
Figure 6:
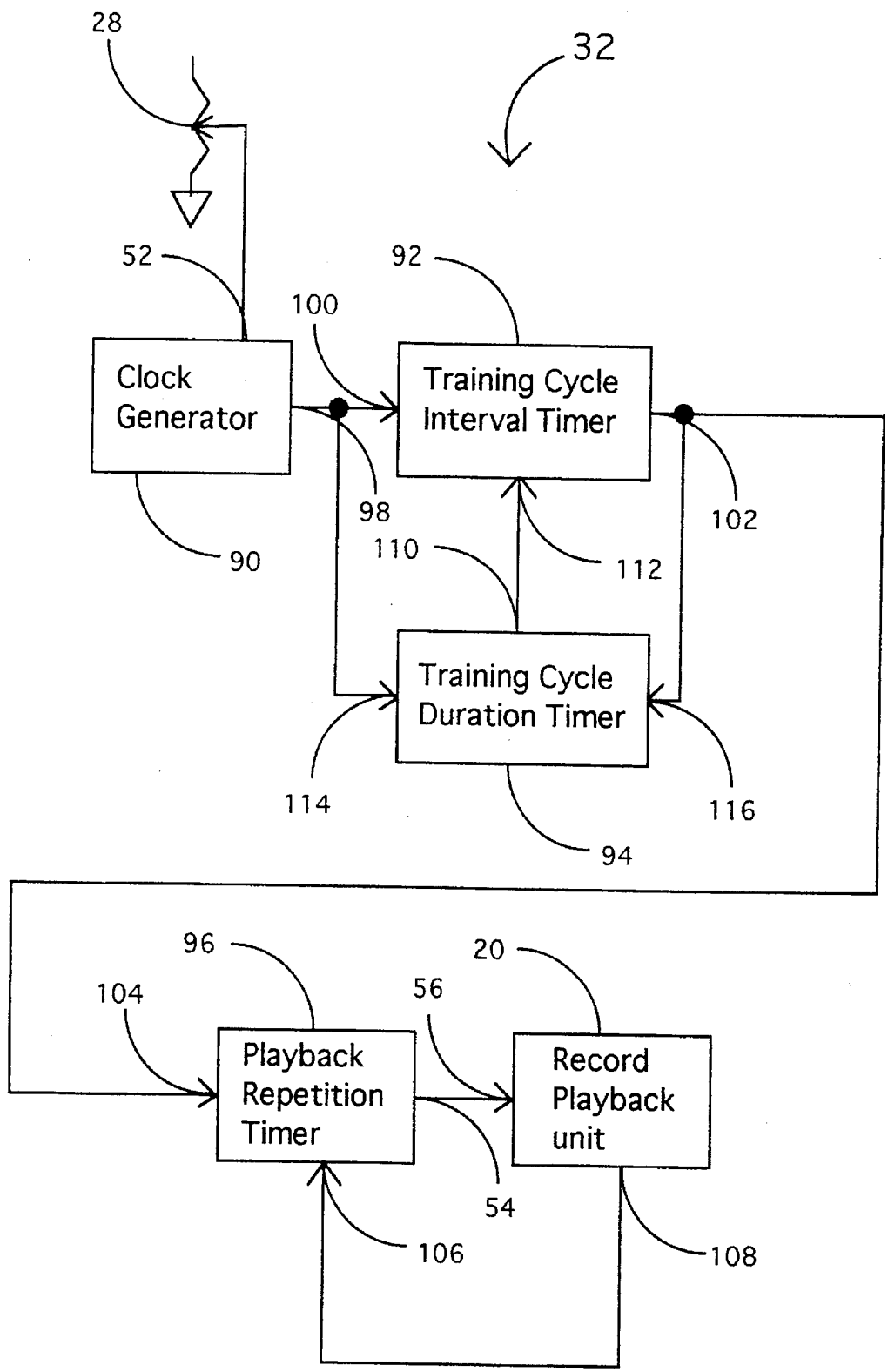
FIG. 6 is a schematic diagram illustrating a pattern block generator used in one embodiment of the present invention.

A pattern generator 32, useful for the training device of the present invention, is illustrated in FIG. 6. The pattern generator 32, as shown, has four functional components, which deliver the particular training pattern illustrated in FIGS. 4 and 5. These functional elements for this training scheme include a Clock Generator 90, a Training Cycle Interval Timer 92, a Training Cycle Duration Timer 94, and a Playback Repetition Timer 96.

The play interval control switch permits the user select or specify the desired training pattern by adjusting electrical resistance 28, which provides input 52 to the clock generator 90 to increase or decrease the clock frequency output 98. Output 98 of the clock generator is input 100 to the training cycle interval timer 92 and also input 114 to the training cycle duration timer 94. By maintaining a common input 98 to both the training cycle interval timer and the training cycle duration timer, a relationship between the duration of training session 74 (FIG. 4) and the time interval between sessions 76 can be maintained in accord with a preferred embodiment of the invention. Thus, training patterns can be provided at a controlled interval in a adjustable format that accomodate a variety of bird species, ages and abilities.

At the onset of an 8192 clock cycle, (1) clock generator 90 provides output 98 input 100 of the training cycle interval timer 92 and (2) output 102 of the training cycle interval timer 92 provides input 104 to the playback repetition timer 96 and input 116 to the training cycle duration timer 94. Output 54 from repetition timer 96 provides input 56 to record playback unit 20 enabling one audible playback of the previously recorded message 70 (FIG. 4) to be heard.

At the completion of the single message playback 70, the record playback unit 20 provides output 108 to input 106 of the playback repetition timer 96 to reset the internal timing function and provide a brief delay 72, about several seconds. After delay 72, playback repetition timer 96 again provides output 54 to input 56 of the record playback unit 20 to again trigger an audible playback of the previously recorded message. This sequence produces one session of the training sequence 74 illustrated in FIG. 4. Output 102 from the training cycle interval timer 92 to input 114 of training cycle duration timer enables an additional 512 clock cycles to be counted by the training cycle duration timer 94 via input 114 from output 98 of the clock generator 90. At the onset of this count value, output 110 from the training cycle duration timer 94 to input 112 of the training cycle interval timer 92 cancels output 102 to input 104 of the playback repetition timer 96 and discontinues further training for a predetermined period of time 76.

The training cycle interval timer is cleared to an all logical zero state. The entire process is again repeated after the predetermined count value is again obtained via the timing cycle interval timer 92.

Figure 7:
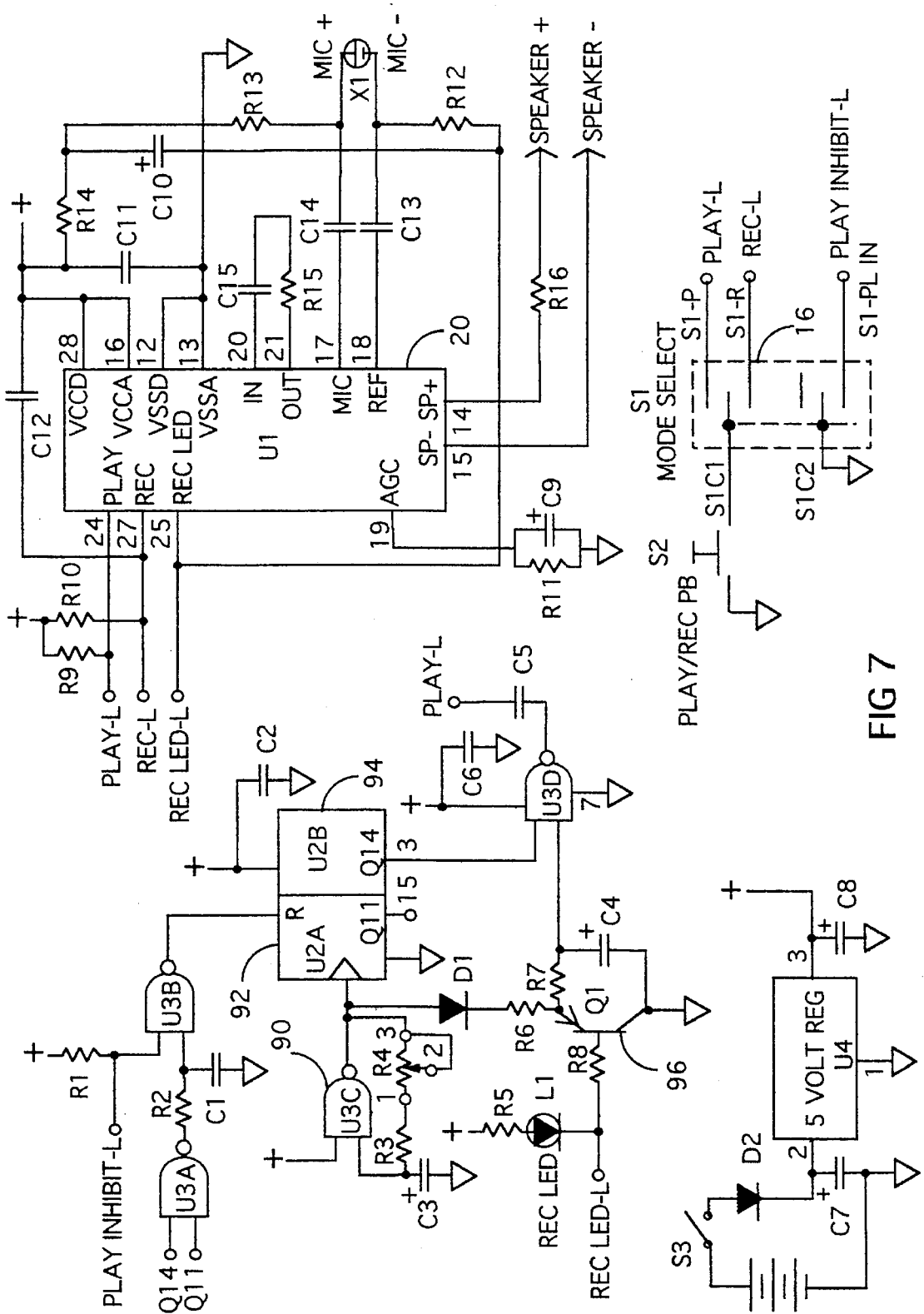
FIG. 7 is a schematic diagram of the wiring connections for the present invention.

A schematic diagram showing wiring connections for an embodiment of a bird training device in accord with the present invention is illustrated in FIG. 7 wherein resistors are indicated as R1, R2, etc., capacitors as C1, C2, etc., switches as S1, S2, etc.

A preferred bird training device of this invention can alter the total training period 74 and interval 76 with respect to each other. In this way, different species of birds and different learning rates can be accomodated while still producing the same audible message playbacks directed to the bird throughout the day. Examples of relative time periods for the illustrated training profile FIGS. 4 and 5) are on the order of about 5 seconds for the time between successive message playbacks in a training session, from about 1 to about 6 minutes for the period of the training session (training session duration 74), and from about 10 to about 75 minutes between training sessions (training session interval 76). The duration of the training session should typically provide sufficient time for from about 6 to about 120 repetitions of the message to be learned. Of course, these relative time periods can be varied according to the species, the length of the recorded message, and other training variables. Typically, the pattern generator can vary the time between trining sessions (i.e., playing intervals) from a preset minimum time to a preset maximum time and the number of repetitions in a particular training session is predetermined to be a smaller number at the minimum time and a larger number at the maximum time.

The training device of the present invention is operated as follows:

MESSAGE RECORDING

First, a recording is made of the message desired to be taught. To record the message, the user sets the operation mode switch 16, located on the face of the enclosure 12, to the record position 16*r* (record). The recording process is initiated and indicator lamp 24 illuminated by activating and holding test/record switch 22 located on the face of the enclosure 12. Once the illumination of indicator lamp 24 has been verified, the desired message is spoken into the microphone element 18 on the face of enclosure 12. At the completion of the spoken message, the test/record switch 22 is released, terminating the recording process and extinguishing the record indicator lamp 24. The recording process may be repeated by reactivating test/record switch 22 in accordance with the above procedure, if a pronunciation error or other undesirable audible sound occurred during the time of recording.

MESSAGE PLAYBACK

To verify the newly recorded message, the bird training device 10 is then set to the playback mode of operation. The user positions the mode switch 16 to the play position 16*p* (play). Momentarily activating test/record switch 22 initiates the playback function, allowing the audible message to be heard by speaker element 30 through the plurity of holes in the rear side of enclosure 12. The stored message may be sampled as desired, by activating test/record switch 22 while mode switch 16 is set to the 16*p* (play) position.

BIRD TRAINING

Figure 4:
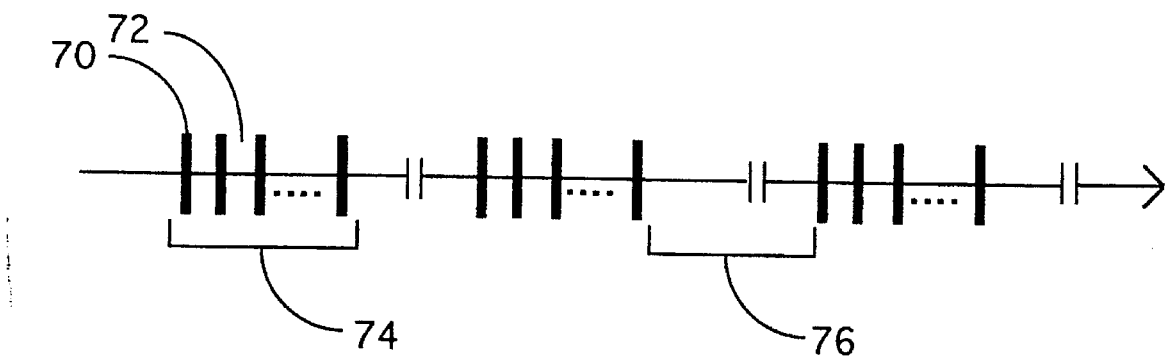
FIG. 4 and 5 are graphs showing the training session profile produced by the improved bird training device with the play interval adjustment set to minimum and maximum respectively.

Training sessions may begin once the desired message has been recorded into the improved bird training device 10. With the mode switch 16 set to the play position 16*p* (play), the training interval adjustment 28 on the face of enclosure 12 is rotated to the desired play interval position. Referring to FIGS. 4 and 5, the play interval is adjusted by the user to provide the unique training sessions and intervals provided by devices in accord with the present invention. Each training session 74 comprises a recorded message 70 continuously repeated with brief delay 72 between successive messages. As illustrated in FIGS. 4 and 5, the duration of each training session 74 is directly proportional to the play interval time 76. The specific relationship between the duration of each training session and the play interval can be varied by those skilled in the art by making suitable changes to the pattern generator. Shown in FIG. 1, 2, 4 and 5, the play interval adjustment 28 provides the user input 52 to pattern generator 32 to vary the training interval 76 and duration 74 respectively. This improved feature allows birds of all species, ages and abilities to be trained at a level that is in accordance with their learning capacity. Thus, in accord with the present invention, the training interval and duration of the training session can be adjusted as the bird learns.

Although the invention disclosed herein has been shown for the purpose of training a bird to recite words, sounds or music, the present invention may be adapted by those skilled in the art so as to provide acoustic training for a young child or a soothing device for an infant or other mammals. Thus, what has been described is a bird training device for the purpose of training a bird to repeat words, sounds or music, the device having the ability to digitally record, store and playback a message without recording medium degradation, the ability to provide an improved training pattern that may be altered to match the ability of the specific bird being trained.

The present invention has been described and illustrated including preferred embodiments thereof. However, it should be understood that, upon consideration of the present specification and drawings, those skilled in the art may make variations, additions, and modifications without departing from the spirit and scope of the present invention.

What is claimed is:

1. A training device for teaching a bird to recite words, sounds or music, said device comprising:

a digital recording and playback device that records and plays a desired message;

a pattern generator that controls the playing of the desired message for a predetermined number of times at predetermined intervals, and a controller that variably adjusts the time between playing intervals and the number of times the desired message is played at each playing interval.

2. The training device of claim 1, wherein the pattern generator can vary the time between playing intervals from a preset minimum time to a preset maximum time and the number of repetitions is predetermined to be a smaller number at the minimum time and a larger number at the maximum time.

3. The training device of claim 2, wherein the minimum time between playing intervals is about 10 minutes and the maximum time between playing intervals is about 75 minutes.

4. The training device of claim 2, wherein the minimum number of repetitions is about 6 and the maximum number of repetitions is about 120.

5. A method for training a bird, the method comprising:

providing a training device comprising a digital recording and playback device for recording and playing a desired message;

a pattern generator that controls the playing of the desired message for a predetermined number of times at predetermined intervals; and a controller that variably adjusts the time between playing intervals and the number of times the desired message is played at each playing interval;

selecting a first training interval having a preset number of repetitions of a desired message; and gradually increasing the time between training intervals and the number of repetitions of the desired message in each interval until the bird is trained to repeat the desired message.

\* \* \* \* \*